United States Patent [19]

Erikson et al.

[11] 4,131,031

[45] Dec. 26, 1978

[54] ANTI-BACKLASH NUT ASSEMBLY

[75] Inventors: Kenneth W. Erikson, Merrimack; Keith W. Erikson, Nashua, both of N.H.

[73] Assignee: Kerk Motion Products, Inc., Nashua, N.H.

[21] Appl. No.: 816,984

[22] Filed: Jul. 19, 1977

[51] Int. Cl.² ............... F16H 55/18; F16H 1/18; F16H 55/22; B21D 53/28
[52] U.S. Cl. ................... 74/441; 29/159.2; 74/409; 74/424.8 A; 74/459
[58] Field of Search .......... 74/441, 459, 409, 424.8 R, 74/424.8 A, 89.15; 29/159.2

[56] References Cited
U.S. PATENT DOCUMENTS

| | | | |
|---|---|---|---|
| 2,385,194 | 9/1945 | Carroll | 74/441 |
| 3,094,011 | 6/1963 | Bradley | 74/424.8 A X |
| 3,592,075 | 7/1971 | Clark | 74/424.8 A X |
| 4,023,431 | 5/1977 | Pavlas | 74/424.8 A |

*Primary Examiner*—Leonard H. Gerin
*Attorney, Agent, or Firm*—David E. Brook

[57] ABSTRACT

An anti-backlash nut assembly is disclosed of the type which undergoes translational movement along a screw in response to relative rotational movement between the nut and screw. The assembly includes a nut which is axially-split into first and second portions, both of which have an internal thread complementary to the external thread of the screw. The two portions of the axially-split nut are retained in the radial direction by a spacer, and a spring is used to apply biasing in the longitudinal direction to minimize backlash.

8 Claims, 7 Drawing Figures

ANTI-BACKLASH NUT ASSEMBLY

BACKGROUND OF THE INVENTION

1. Field of the Invention

This invention is in the field of anti-backlash nut assemblies.

2. Description of the Prior Art

There are many applications in which it is important to drive an element in a machine along a screw which provides accurate positional repeatability and constant drag torque control. Data printers and x-y tables, used as peripheral equipment in the computer industry, for example, have such requirements.

Positioning devices designed to meet these requirements have been proposed, and many of these employ an anti-backlash nut assembly to achieve the positional accuracy along the screw which is required. Examples of two such anti-backlash nut assemblies which have been proposed are described in the patent literature as follows.

In U.S. Pat. No. 3,656,358, issued to Kopp, a linear positioning device is disclosed which is stated to have an improved collar for use with a comparatively inexpensive rod having multiple grooves. The collar is telescoped over and adapted to be translated back and forth relative to the elongated rod. This collar includes cantilevered fingers which are resiliently wedged into angularly spaced grooves formed in the rod to preload the collar onto the rod and prevent rotational play from developing between the two. In one specific embodiment, the collar is telescoped onto a rod in the form of a splined shaft while in another embodiment, the collar is a nut threaded onto a screw with multiple threads.

In U.S. Pat. No. 3,977,269, issued to Linley, an anti-backlash, self-aligning nut construction with specially constructed tubular nut bodies which coact with concentric spring sleeves is described. The nut bodies, in general, each have a pair of spring-biased elements provided with internal thread formations adapted for engagement with the external threads of a screw. In one embodiment, a self-aligning spring sleeve is provided having solely three pairs of oppositely-disposed transverse slots to obtain the desired aligning features. The nut body has a base portion which is separated from the spring-biased elements by means of two transverse slots which, together with an adjacent pair of slots in the spring sleeve, form in effect a universal joint. One of the remaining slot pairs in the sleeve is oriented circumferentially with respect to the first pair by an angle of 90°, with the third pair of slots being circumferentially aligned with the first pair.

Despite such prior proposals, none of the anti-backlash nut assemblies heretofore proposed has been entirely satisfactory. There is still a need for an anti-backlash nut assembly which is effective to assure positional repeatability and constant drag torque control, but is also easily and inexpensively manufactured.

SUMMARY OF THE INVENTION

This invention related to a new anti-backlash nut assembly designed to undergo translational movement along a threaded screw in response to relative rotational movement between the two. A unique feature of this anti-backlash nut assembly is that it contains a nut which is axially split into a first portion and a second portion. Both the first portion and the second portion of the axially-split nut are joined together to form the complete nut, which is then capable of translational movement along the screw. Means for retaining the first and second portions around the screw are provided, and one such means comprises a hollow cylindrical spacer.

Means to bias the first and second portions in opposite longitudinal directions along the screw are also provided. A suitable means for biasing is an open-wound helical spring which forces the two axially-split portions in opposite longitudinal directions.

In a preferred embodiment, the first and second axially-split portions can be mated together to form a cylindrically shaped nut with a hollow bore for the screw. The first portion of the nut is integrally connected to a tubular section having a larger outside diameter than the nut so that its face provides a shoulder for restraining one end of a helical spring used to bias the respective portions of the nut in opposite longitudinal directions. A faceplate for mounting an element of a machine to be driven along the screw is also integrally connected to the tubular section. The second portion of the axially-split nut has a section of enlarged outside diameter to provide a shoulder for restraining the other end of the helical spring.

The anti-backlash nut assembly of this invention has been found to offer outstanding advantages. A very significant advantage, for example, is the constant drag torque provided over the life of the unit irrespective of thread wear. Constant drag torque is established since the torque is directly proportional to the sum of the frictional forces retarding the turning motion of the screw when subjected to torque loadings. The longitudinally split-nut configuration allows for radial inconsistencies, and thus minimizes frictional forces produced by screw diameter variations. Total frictional forces are thus produced solely by the compression spring preload. Because the spring force is constant throughout nut travel and life of the unit, drag torque remains constant.

The compression spring preload also forces the nut body against the screw thread flanks and thus eliminates backlash.

Additionally, the axially-split nut can be manufactured more easily and inexpensively than most other anti-backlash nut assemblies. This is because it is longitudinally split which enables a "drop-out" injection molding process to be used instead of the normal "screw-out" process required for previously molded one-piece nut assemblies.

DESCRIPTION OF PREFERRED EMBODIMENTS

Figure 1:
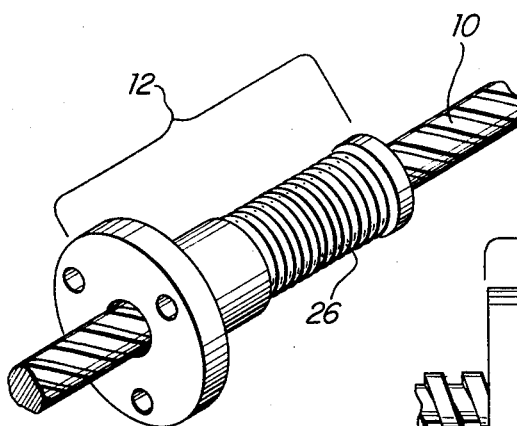
FIG. 1 is a perspective view illustrating an anti-backlash nut assembly according to this invention.
Figure 2:
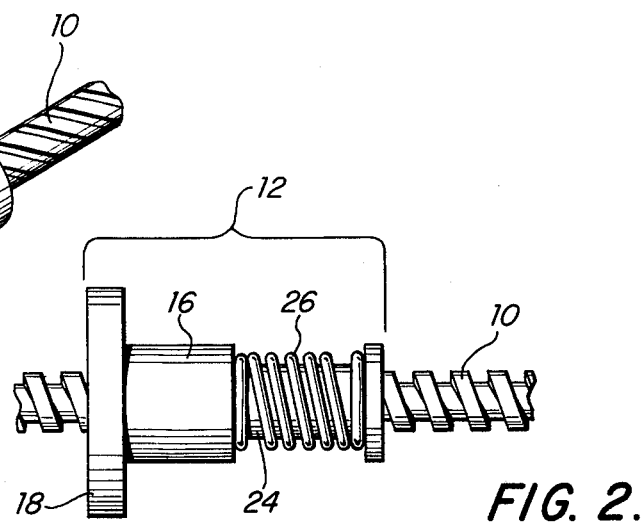
FIG. 2 is a side elevation view illustrating an anti-backlash nut assembly of this invention.
Figure 3:
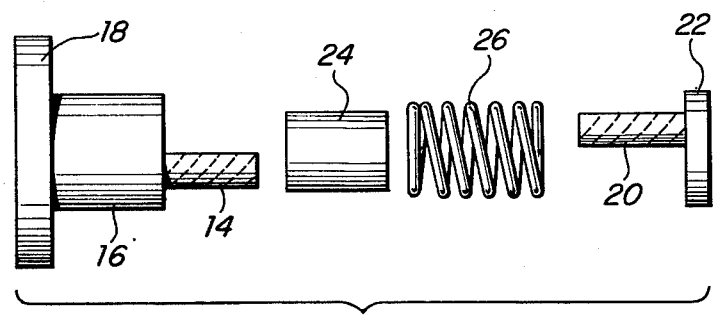
FIG. 3 is a side elevation view of the disassembled components of an anti-backlash nut assembly of this invention.
Figure 4:
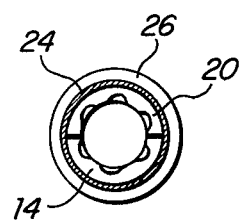
FIG. 4 is a cross-sectional view through an axially-split nut assembly of this invention.

This invention can be further described by referring to the Figures in more detail.

In FIGS. 1-4, one embodiment of an anti-backlash nut assembly is illustrated as having a screw 10 and a nut assembly 12. The unique construction of nut assembly 12 can be seen clearly in FIGS. 2 and 3. Therein, a first integral section is illustrated as having first portion 14 of an axially-split nut, tubular section 16 having an enlarged outside diameter and a through-hole for screw 10, and faceplate 18 which also has a through-hole. As can be seen, the first portion 14 of the axially-split nut forms approximately one-half of a cylindrical nut having internal threads complementary to the external threads on screw 10. The second half of the complete cylindrical axially-split nut is provided by second portion 20 which has a raised shoulder formed by a section 22 with an increased outside diameter but also having a through hole.

First portion 14 and second portion 20 are retained in an aligned position about screw 10 by cylindrical, hollow spacer 24. Open wound helical spring coil 26 is placed around the outside of spacer 24 and has one end abutting the edge of tubular section 16 and its other end abutting the raised shoulder of section 22. Thus, spring 26 forces the first portion 14 and second portion 20 of the axially-split nut in opposite longitudinal directions to insure good contact with the flanks of the thread on screw 10.

The various components of the axially-split anti-backlash nut assembly can be fabricated from a variety of materials. The first and second portions of the nut could, for example, be fabricated from metals such as steel or cast bronze, or from any thermoplastic moldable polymer composition. It is preferred to mold components which contact the screw from low-friction, self-lubricating polymer compositions which have outstanding wear characteristics. Other components could be similarly made from metal or plastics.

Figure 5:
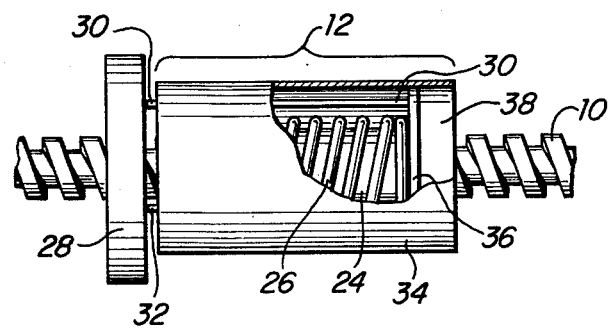
FIG. 5 is a partially cut-away side elevation view showing an alternative embodiment of an anti-backlash nut assembly according to this invention which embodiment has radial flexures therein; and, FIG. 6 is a cut-away diagram illustrating removal of a screw used to internally thread a nut in a prior art molding operation; and, FIG. 7 is a cut-away diagram illustrating a drop-out molding process for producing both portions of an axially-split nut according to this invention.

FIG. 5 illustrates an alternative embodiment of an axially-split anti-backlash nut assembly according to this invention. In this embodiment, components similar to those previously described have been given numerals corresponding to those previously used. Thus, there is an externally threaded screw 10 and an anti-backlash nut assembly 12. Anti-backlash nut assembly 12 is formed from an axially-split nut having first and second portions similar to those previously described but not shown in FIG. 5. Additionally, the axially-split nut is retained in contact with screw 10 by hollow cylindrical spacer 24 and a helical spring 26 is used to bias the first and second portions in opposite longitudinal directions. This assembly additionally includes, however, a free floating faceplate 28 which is joined to the nut by radial flexures such as flexures 30 and 32. It is preferred to join faceplate 28 to the nut by three radial flexures to provide good structural integrity. Radial flexures 30 and 32 extend from faceplate 28 through outer cylindrical housing 34 to the far end of the nut where they are fastened to an aluminum plate 36 which is in turn joined to plastic end piece 38 which is molded integrally with a portion of the axially-split nut. Of course, plate 36 and end piece 38 could be fabricated from other materials.

Also, other means for fastening the flextures 30 and 32 onto the nut could be used. Flexures 30 and 32 could be formed from many different materials, with spring steel being preferred. These flexures serve to allow faceplate 28 to be somewhat free floating to compensate for misalignment between screw 10 and the mounting shafts for a device being driven along screw 10 by the nut assembly 12. Thus, potential binding problems are eliminated.

Figure 6:
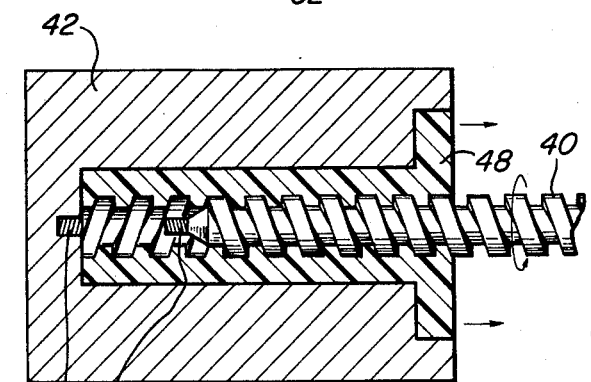

FIG. 6 illustrates the withdrawal of a threaded mold insert 40 which has been used in injection mold 42 in a typical injection molding cycle for prior art nuts. Insert 40 has a threaded tip 44 which is screwed into tap 46 to hold insert 40 in mold 42 during the injection molding process. Insert 40 serves to form internal threads on nut 46 which is formed during the molding operation. As illustrated, threaded mold insert 40 is removed after nut 48 has been formed by rotating it in the counterclockwise direction. While this procedure is effective, it has the disadvantage of requiring a relatively time-consuming step of removing threaded mold insert 40 after the rest of the molding cycle has been completed. Often, this is done by hand which not only is time consuming but also adds inordinately to the cost of manufacturing the nut.

Figure 7:
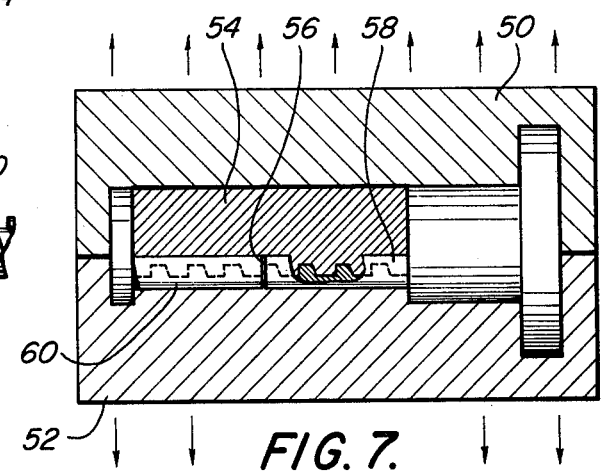

FIG. 7 illustrates a molding process which can be used to manufacture axially split nuts according to this invention. This process is often referred to as a drop-out injection molding process and it eliminates the requirement for removal of a threaded mold insert after the cycle is complete.

In the drop-out injection molding process, a two part mold consisting of upper mold section 50 and lower mold section 52 is used. A mold insert 54 is provided to mold an appropriate thread onto the inside of the nut. Threaded mold insert 54 can be separate from upper mold section 50, in which case it is inserted prior to the molding cycle, or it can be formed as an integral part of upper mold section 50. Mold insert 54 is also provided with a small extension 56 which serves to separate the first portion 58 from second portion 60 of the axially-split nut being molded. After the nut has been molded, upper mold section 50 is separated from lower mold section 52 to release first portion 58 and second portion 60 of the axially-split nut. Thus, the requirement to subsequently remove a threaded insert by manually or otherwise back-screwing the insert is eliminated.

Those skilled in the art will recognize, or be able to ascertain using no more than routine experimentation, many equivalents to the specific components, elements, steps, materials, etc., described herein. It is possible, for example, to have more than two axially-split portions for the nut assembly, although this is usually not preferred. Such equivalents are intended to be covered by the following appended claims.

What is claimed is:

1. An anti-backlash nut assembly designed to undergo translational movement along a screw having an external thread thereon in response to relative rotational movement between the nut assembly and screw, comprising, in combination:
   a. a first portion of an axially-split nut having an internal thread complementary to the external thread of said screw;
   b. a second portion of said axially-split nut, said second portion also having an internal thread complementary to the external thread of said screw;

c. means for retaining said first portion and said second portion of the axially-split nut in an aligned position around said screw whereby their internal threads engage the external threads of said screw; and, d. means for biasing said first portion and said second portion of the axially-split nut in opposite longitudinal directions.

2. An anti-backlash nut assembly of claim 1 wherein said means for retaining comprises a hollow, cylindrical spacer positioned around said first portion and said second portion of the axially-split nut.

3. An anti-backlash nut assembly of claim 2 wherein said means for biasing comprise and open wound helical spring positioned around said hollow cylindrical spacer.

4. An anti-backlash nut assembly of claim 3 wherein said first portion of the axially-split nut is integrally joined to a tubular member providing a shoulder for restraining one end of said spring.

5. An anti-backlash nut assembly of claim 4 wherein said second portion of said axially-split nut has a raised shoulder for restraining the other end of said spring.

6. An anti-backlash nut assembly of claim 5 also including at least one radial flexure.

7. An anti-backlash nut assembly of claim 1 wherein said first portion and said second portion are molded from a low friction, self-lubricating polymer composition.

8. An anti-backlash nut assembly of claim 5 wherein said first portion and said second portion are molded from a low friction, self-lubricating polymer composition.

* * * * *